(12) United States Patent
Chaussinand et al.

(10) Patent No.: US 11,001,137 B2
(45) Date of Patent: May 11, 2021

(54) TANK COMPRISING A PRESSURE SENSOR AND ANOTHER SENSOR

(71) Applicant: Plastic Omnium Advanced Innovation and Research, Brussels (BE)

(72) Inventors: Antoine Chaussinand, Brussels (BE); David Hill, Commerce Township, MI (US)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/954,278

(22) PCT Filed: Dec. 20, 2018

(86) PCT No.: PCT/EP2018/086351
§ 371 (c)(1),
(2) Date: Jun. 16, 2020

(87) PCT Pub. No.: WO2019/122219
PCT Pub. Date: Jun. 27, 2019

(65) Prior Publication Data
US 2020/0376952 A1     Dec. 3, 2020

(30) Foreign Application Priority Data

Dec. 20, 2017   (EP) .................................... 17209095

(51) Int. Cl.
*B60K 15/03*       (2006.01)
*G01L 19/00*       (2006.01)
(Continued)

(52) U.S. Cl.
CPC .......... *B60K 15/03* (2013.01); *G01L 19/0092* (2013.01); *B60K 2015/03217* (2013.01); *G01F 23/14* (2013.01); *G01K 1/14* (2013.01)

(58) Field of Classification Search
CPC .......... B60K 15/03; B60K 2015/03217; G01L 19/0092; G01F 23/14; G01K 1/14
See application file for complete search history.

(56) References Cited

U.S. PATENT DOCUMENTS 7,788,048 B2 *  8/2010  Thielman ................ G01F 23/18
                                                   702/55
10,072,621 B2 *  9/2018  Fukuoka ............ F02M 37/0076
(Continued)

FOREIGN PATENT DOCUMENTS

DE   10 2006 034 210 A1   1/2008
GB      2 284 581 A        6/1995
JP       11-294284 A      10/1999

OTHER PUBLICATIONS

International Search Report dated Apr. 2, 2019 in PCT/EP2018/086351 filed on Dec. 20, 2018.

*Primary Examiner* — Freddie Kirkland, III
(74) *Attorney, Agent, or Firm* — Oblon, McClelland, Maier & Neustadt, L.L.P.

(57) ABSTRACT

The fuel tank (1) comprises: an electronical board, a first sensor connected to the electronical board, the first sensor being a pressure sensor, a pressure port (7) forming a hole through a wall (12) of the tank, at least one second sensor (4) extending fully inside the tank, and a connector (10) connecting the second sensor to the electronical board through the pressure port, a first part (14) of the connector being connected to the second sensor by at least one first wire (13) and a second part (9) of the connector being connected to the electronical board by at least one second wire (8).

14 Claims, 3 Drawing Sheets

(51) Int. Cl.
*G01F 23/14* (2006.01)
*G01K 1/14* (2021.01)

(56) References Cited

U.S. PATENT DOCUMENTS 10,400,713 B2 * 9/2019 Mills ................. F02M 25/0872
2017/0211530 A1 7/2017 Fukuoka et al.

* cited by examiner

TANK COMPRISING A PRESSURE SENSOR AND ANOTHER SENSOR

The invention relates to tanks for liquids, such as vehicle fuel tanks.

In order to measure the temperature of the inside of a vehicle fuel tank, especially the temperature of a specific location inside the tank, for example a vapor dome temperature, three main solution exist.

The first solution consists in a pressure sensor equipped with a temperature sensor which is added inside the tube of the pressure port. This solution has some drawbacks. For example, the temperature sensor location is defined by the pressure sensor location which limits the possibilities to measure the vapor dome temperature properly. Indeed, the position of the temperature sensor cannot be freely chosen and is not necessarily the most accurate position for obtaining a temperature of a particular area of the inside of the tank such as a vapor dome temperature.

The second solution consists in a temperature sensor which is implemented inside a wall of the tank and connected through the flange. This solution has some drawbacks. For example, there is a need to modify an additional part of the tank, i.e. the flange, by adding some pins. This leads to an increase of the manufacturing cost and to the presence of additional wires for the connection to the electronic control unit of the tank.

The third solution is a temperature sensor put on with its own hole through the tank wall. This solution also has some drawbacks. For example, the fuel vapor emissions are increased and there are additional wires for the connection to the electronic control unit of the tank.

The present invention aims to provide an improved fuel tank.

The invention relates to a fuel tank comprising:
an electronical board,
a first sensor connected to the electronical board, the first sensor being a pressure sensor,
a pressure port forming a hole through a wall of the tank,
at least one second sensor extending fully inside the tank, and
a connector connecting the second sensor to the electronical board through the pressure port, a first part of the connector being connected to the second sensor by at least one first wire and a second part of the connector being connected to the electronical board by at least one second wire.

The presence of the connector allows the second sensor to be located at any place inside the fuel tank and thus allows the sensor to be placed at the best location for obtaining the most accurate measurement. The connector is an electrical connector.

As the connector connects the second sensor to the electronical board through the pressure port, no additional hole is needed in the tank wall, therefore reducing the risk of fuel vapor emissions.

The pressure sensor and the second sensor are both connected to the electronical board which is capable of reading both signals. Preferably, the electronical board is also capable of conditioning both signals inside a digital signal to transmit it to an electronic control unit (ECU). The digital communication protocol can be SENT, CAN or LIN, for example. Of course, other suitable digital communication protocols may be used. As the second sensor is connected to the electronical board which is already connected to the ECU (for sending the signal of the pressure sensor), there is no need for additional wires for the connection to the ECU.

The term "fuel tank" is understood to mean an impermeable tank that can store a liquid such as fuel under diverse and varied environmental and usage condition. An example of this tank is that with which a motor vehicle is equipped. The fuel tank according to the invention is preferably made of plastic (i.e. its wall is principally made of plastic). The term "plastic" means any material comprising at least one synthetic resin polymer. Any type of plastic may be suitable. Particularly suitable are plastic that belong to the category of thermoplastics.

The term "thermoplastic" is understood to mean any thermoplastic polymer, including thermoplastic elastomers as well as blends thereof. The term polymer is understood to mean both homo- and copolymers (especially binary and ternary copolymers). Examples of such copolymers are, without being limited to, random copolymers, linear block copolymers, other block copolymers and grafts copolymers.

Advantageously, the two parts of the connector are de-connectable from each other.

For example, the first part of the connector may have a male end and the second part of the connector may have a corresponding female end. Alternatively, the first part of the connector may have a female end and the second part of the connector may have a corresponding male end.

Preferably, the pressure sensor is connected to the pressure port.

Advantageously, the connector is configured for connecting at least a third sensor to the electronical board, said connector being connected to the third sensor by at least a third wire.

In this embodiment, the connector may have two first parts, one connected to the second wire of the second sensor and one connected to the third wire of the third sensor.

The first part of the connector may be configured so as to be connectable to as many wires as there are sensors in the tank. For example, the connector may be configured so as to be connectable to four, five, six, seven, eight, nine or ten wires, each of these wires being respectively connected to a sensor.

In an embodiment, the second sensor and/or the third sensor is attached to the tank via a support.

The support may be for example of the dovetail joint or clip type. The support may be placed on the wall of the tank during the manufacture of the tank, for example during a twin sheet blow molding (TSBM) process or by welding. Other types of support may be used.

In an embodiment, the second sensor and/or the third sensor is welded to the tank.

In an embodiment, the second sensor and/or the third sensor is attached to a fuel delivery module.

The sensor may be directly attached to the fuel delivery module or may be mounted on a support which is attached to the fuel delivery module.

Preferably, the second sensor and/or the third sensor is selected from the group consisting of a temperature sensor, a pressure sensor and a level sensor.

The second and third sensors may be different types of sensors. The second and third sensors may also be of the same type of sensor. For example, the second sensor may be a temperature sensor and the third sensor may be a level sensor.

Advantageously, the second sensor and/or the third sensor is a temperature sensor and is located so as to be able to measure a vapor dome temperature of the tank.

For example, the second sensor and/or the third sensor is located on an inner side of a top portion of the tank wall. In one embodiment, the second sensor and the third sensor are located on two different areas of an inner side of the top portion of the tank wall.

Preferably, the second sensor and/or the third sensor is a temperature sensor coated with a material having a thermal diffusivity comprised between $2 \times 10^{-7}$ and $2 \times 10^{-5}$ m$^2$/s at 20° C.

Such a material is capable of improving the correlation between the actual temperature on the interior of the tank and the associated signal communicated by the temperature sensor. The material may for example be selected from ordinary steel or stainless steel.

Preferably, at least two of the pressure sensor, the second sensor and the third sensor are arranged for sending a digitalized or multiplexed signal.

Thus, the number of wires is not increased for communication with an ECU.

The invention also relates to a method for manufacturing a plastic fuel tank comprising a first sensor and at least one second sensor, the first sensor being a pressure sensor, the method comprising:
  attaching the second sensor comprising a wire and connected to a first part of a connector, to a part of the fuel tank, and
  connecting the first part of the connector to a second part of the connector through a pressure port of the pressure sensor.

For example, the connector connects the second sensor to an electronical board for sending information to the ECU. Preferably, the pressure sensor is also connected to the electronical board which is capable of sending a digitalized or multiplexed signal. Therefore, the second sensor may be located at any desired location in the tank with no need for an additional hole through the tank wall or for additional wires for communication to the ECU.

The process may comprise the attachment of more than one sensor, for example two, three, four or five sensors. Each of these sensors comprises a wire which is connectable to the connector.

Advantageously, the attaching step comprises attaching the second sensor directly to an inner side of a wall of the tank.

In this case, the method may for example comprise the following steps:
  the fuel tank is blown,
  a flange hole is created in the wall of the tank,
  the second sensor is attached on an inner side of the wall of the tank,
  the pressure sensor is placed on a flange,
  the first part of the connector is connected to the second part of the connector, and
  the flange is mounted on the flange hole and locked on the tank.

The second sensor may for example be attached on an inner side of the tank wall using a support, for example a support of the dovetail joint type or via clips. The support may be placed when performing the TSBM process for example. Other processes for placing the support on the tank wall may be used.

The second sensor may be directly attached on an inner side of the tank wall through the flange hole manually or using a robot.

In another embodiment, for example in the case of a complex tank design, where, for example, it is not possible to fix the second sensor manually through the hole of the flange, the process may comprise the following steps:
  the second sensor is mounted on a support,
  the second sensor with its support is placed on a twin sheet blow molding core,
  the tank is blown around the twin sheet blow molding core,
  a flange hole is created,
  the pressure sensor is placed on a flange,
  the first part of the connector is connected to the second part of the connector, and
  the flange is mounted on the flange hole and locked on the tank.

As mentioned before, the process may comprise the attachment of more than one sensor, for example two, three, four or five sensors.

Preferably, the attaching step comprises attaching the second sensor to a fuel delivery module.

In this case, the process may for example comprise the following steps:
  the second sensor is attached to the fuel delivery module,
  the pressure sensor is placed on the flange of the fuel delivery module,
  the first part of the connector is connected to the second part of the connector,
  the fuel tank is blown,
  a flange hole is created, and
  the fuel delivery module is mounted on the flange hole of the tank and the flange is locked.

The attachment of the second sensor on the fuel delivery module may be carried out using a clip link for example.

The invention also relates to a vehicle comprising a fuel tank as described above.

The above and other characteristics, features and advantages of the present invention will become apparent from the following detailed description, taken in conjunction with the accompanying drawings, which illustrate, by way of examples, the principles of the invention. The reference figures quoted below refer to the attached drawings wherein.

Figure 1:
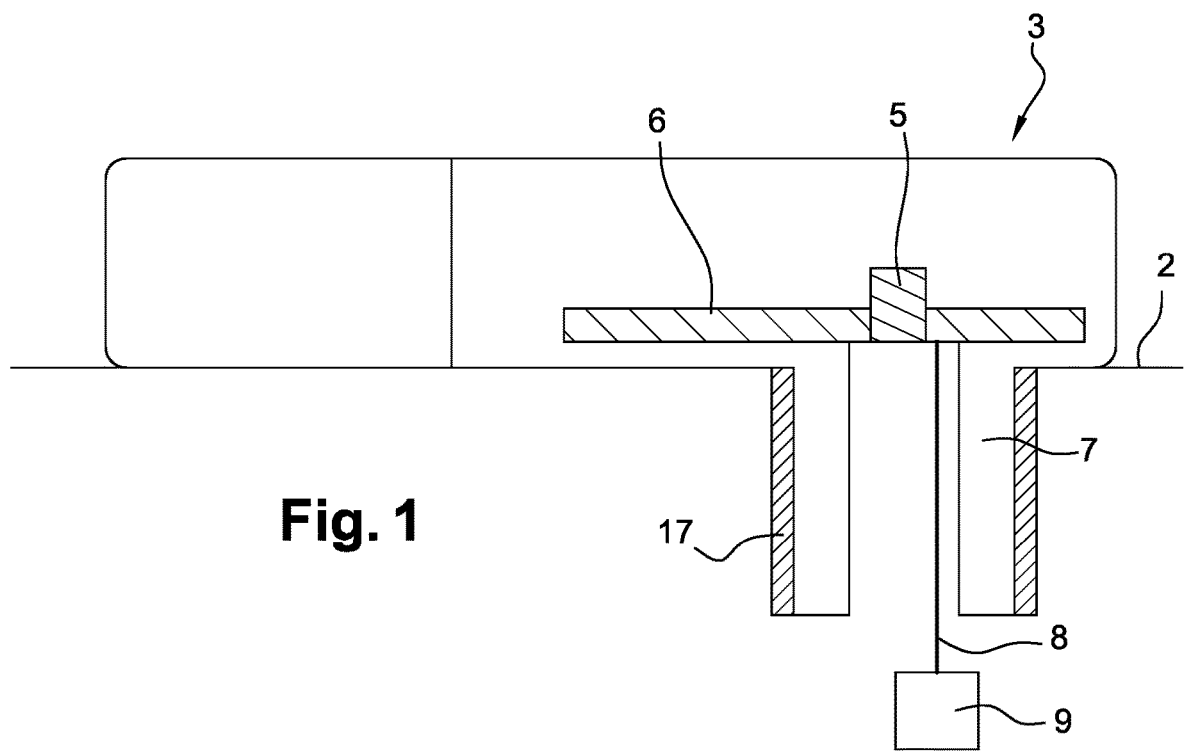
FIG. 1 is a schematic side view of a portion of a fuel tank according to the invention.

The present invention will be described with respect to particular embodiments and with reference to certain drawings but the invention is not limited thereto. The drawings described are only schematic and are non-limiting. In the drawings, the size of some elements may be exaggerated and not drawn on scale for illustrative purposes.

Furthermore, the terms "first", "second", "third" and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Figure 2:
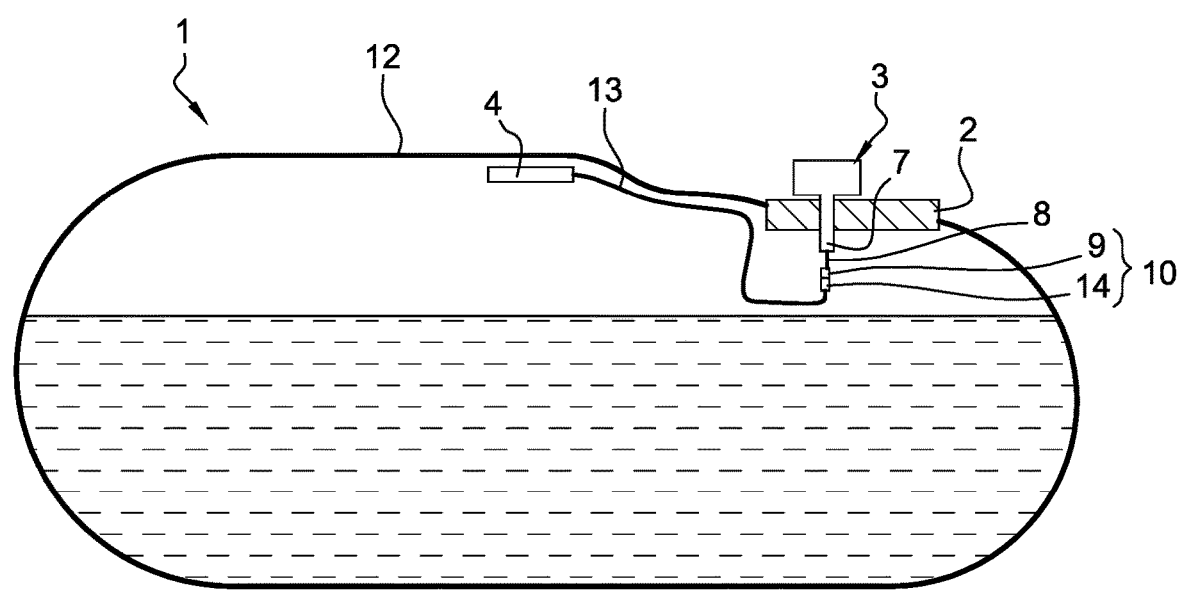
FIG. 2 is a schematic side view of one embodiment of a tank according to the invention.
Figure 3:
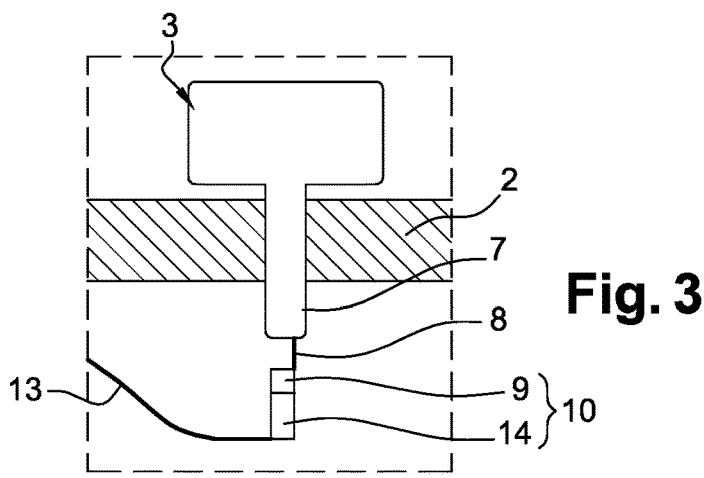
FIG. 3 is a schematic side view of the same portion of the fuel tank as shown in FIG. 1 for the tank of the embodiment of FIG. 2.

First Embodiment (FIGS. 1, 2, and 3)

The fuel tank 1 comprise a flange 2, a pressure sensor assembly 3 mounted on the flange, and a temperature sensor 4. Of course, the temperature sensor 4 may be replaced by another type of sensor, for example a pressure sensor or a level sensor.

In the present embodiment, the wall 12 of the fuel tank 1 is made of a thermoplastic material.

The pressure sensor assembly 3 comprises a pressure sensor 5 which is capable of measuring a pressure. The pressure sensor assembly 3 also comprises an electronical board 6 for pressure signal acquisition, temperature signal acquisition, and the creation of a SENT message and the sending of this message to an electronic control unit (ECU) (not shown) via an electrical connector (see FIG. 1). Of course, the electronical board 6 may be capable of creating other types of messages such as CAN or LIN messages for example. The pressure sensor assembly 3 comprises a pressure port 7. The pressure port 7 has the general form of a hollow pillar and the interior of the pressure port 7 forms a hole through a top portion of the wall 12 of the tank 1. The pressure sensor assembly 3 further comprises a sealing element 17 surrounding a major portion of a median outer surface of the pressure port, thus ensuring a good sealing of the hole in the wall 12 of the tank 1 through which the pressure port 7 is introduced.

An electrical wire 8 connected to the electronical board 6 extends from said electronical board 6 to the inside of the tank 1 through the hole formed by the pressure port 7. This electronical wire 8 is connected at its end ending in the inside of the tank to a female part 9 of a connector 10.

The temperature sensor 4 is attached to an inner side of a top portion of the tank wall 12 (see FIG. 2). The temperature sensor 4 comprises an electrical wire 13 which is connected, at its end which is not connected to the temperature sensor, to a male part 14 of the connector 10.

Thus, the connector 10 is made of two parts: a female part 9 of the connector 10 and a male part 14 of the connector 10 (see FIG. 3).

The female part 9 and the male part 14 of the connector 10 are connected together so that the temperature sensor 4 can send a signal to the electronical board 6. Of course, it can be provided that the electrical wire 8 connected to the electronical board 6 is connected to the female part of the connector 10 and that the wire 13 connected to the temperature sensor 4 is connected to the male part of the connector 10.

At least one other sensor, in addition of the temperature sensor 4, may be present. This other sensor may be of the same or of a different type than the temperature sensor. For example, the other sensor may be a level or a pressure sensor. In this case, the other sensor comprises an electrical wire which is connected, at its end which is not connected to the sensor, to the male part 14 of the connector. The male part 14 of the connector 10 is thus connectable to the electrical wire of the temperature sensor 4 and to the electrical wire of the other sensor.

The process for manufacturing such a tank 1 comprises the following steps:
- the fuel tank 1 is blown,
- the flange hole is created in the wall 12 of the tank 1,
- the temperature sensor 4 is manually attached through the flange hole on an inner side of the wall 12 of the tank 1 using clips (not shown),
- the pressure sensor assembly 3 is placed on the flange 2,
- the male part 14 of the connector 10, which is connected to the wire 13 connected to the temperature sensor 4, is connected to the female part 9 of the connector 10, which is connected to the wire 8 connected to the electronical board 6, and
- the flange 2 is mounted on the flange hole and locked on the tank 1.

Other attachment means for the temperature sensor 4, as mentioned above, could be used. Alternatively, the temperature sensor 4 may be attached using a robot.

Figure 4:
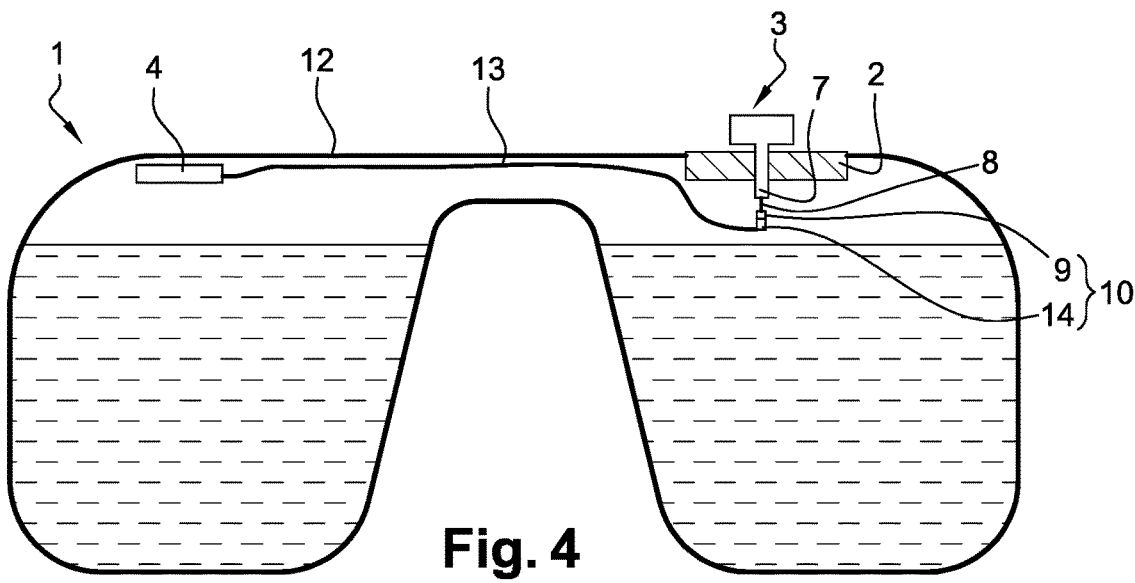
FIGS. 4 and 5 are schematic side views of two other embodiments of a tank according to the invention.

Second Embodiment (FIGS. 1 and 4)

All the features of the tank 1 of this embodiment are identical to those of the first embodiment except that the tank 1 has a complex design (see FIG. 4).

Due to the complex tank design, it is not possible to attach the temperature sensor 4 manually through the flange hole. Thus, the manufacturing process comprises the following steps:
- the temperature sensor 4 is mounted on a support,
- the temperature sensor 4 with its support is placed on a twin sheet blow molding core,
- the tank is blown around the twin sheet blow molding core so that the temperature sensor and its support are welded on an inner side of the wall 12 of the tank,
- the flange hole is created,
- the pressure sensor assembly 3 is placed on the flange 2,
- the male part 14 of the connector 10, which is connected to the wire 13 connected to the temperature sensor 4, is connected to the female part 9 of the connector 10, which is connected to the wire 8 connected to the electronical board 6, and
- the flange 2 is mounted on the flange hole and locked on the tank 1.

Figure 5:
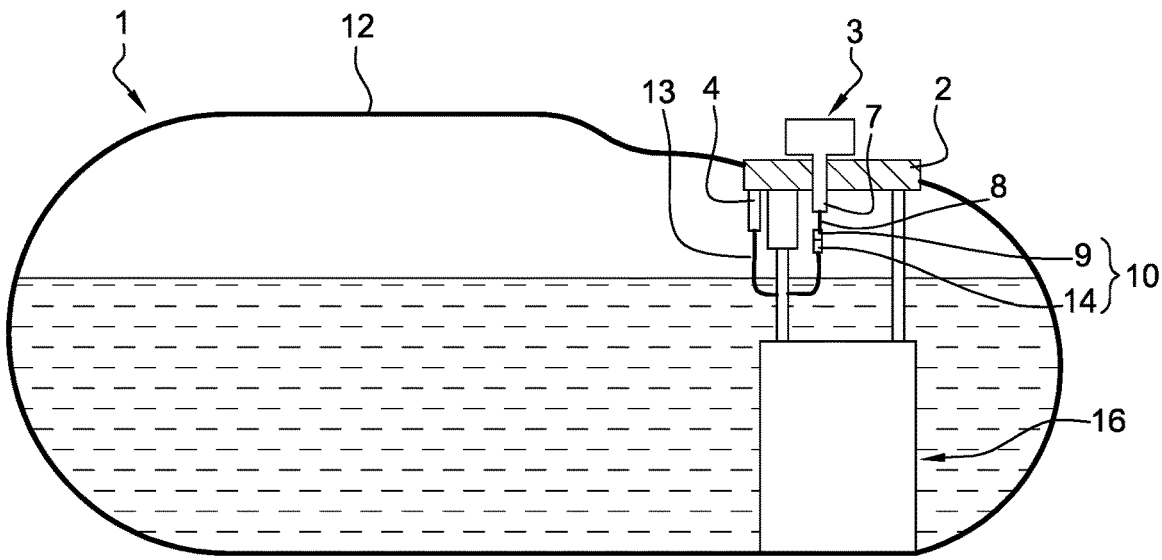
Figure 6:
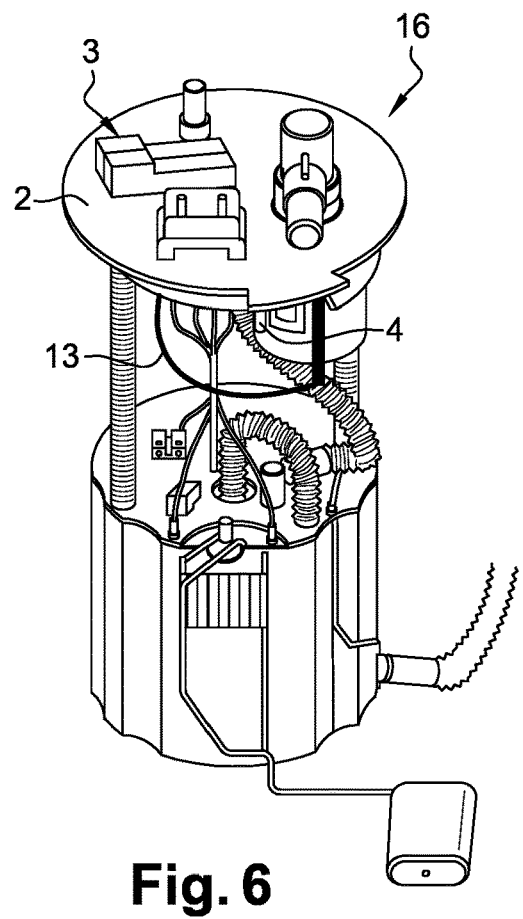
FIG. 6 is a perspective view of a fuel delivery module of the fuel tank of FIG. 5.

Third Embodiment (FIGS. 1, 5 and 6)

All the features of the tank 1 of this embodiment are identical to those of the first embodiment except that the temperature sensor 4 is not directly attached to a wall of the tank but is attached to a fuel delivery module 16 (see FIGS. 5 and 6). The connector 10 is not visible on FIG. 6 because it is hidden by the flange 2. However, the location of the connector 10 is shown on FIG. 5.

The manufacturing process of such a tank 1 comprises the following steps:
- the temperature sensor 4 is attached to the fuel delivery module 16 (this can be done for example by clip linking the temperature sensor to the fuel delivery module),
- the pressure sensor assembly 3 is placed on the flange 2 of the fuel delivery module 16,
- the male part 14 of the connector 10, which is connected to the wire 13 connected to the temperature sensor 4, is connected to the female part 9 of the connector 10, which is connected to the wire 8 connected to the electronical board 6,
- the fuel tank 1 is blown,
- the flange hole is created, and
- the fuel delivery module 16 is mounted on the flange hole of the tank and the flange is locked.

Figure 7:
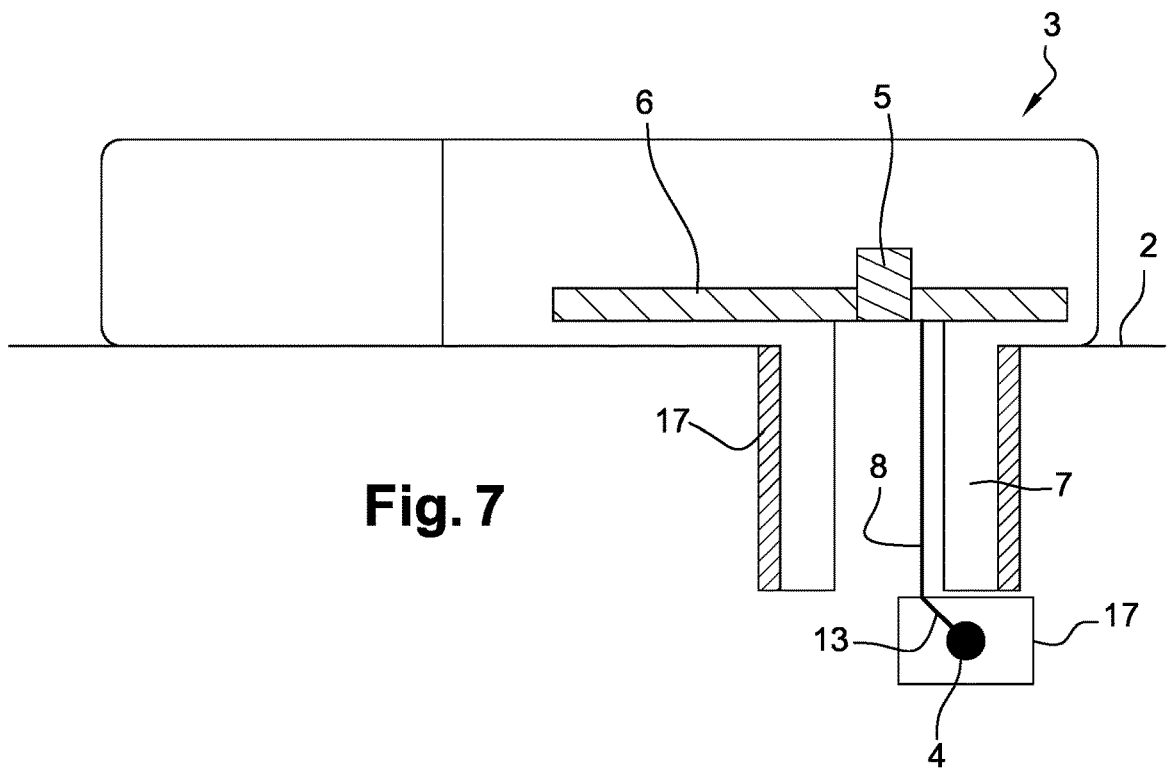
FIG. 7 is a schematic side view of an alternative embodiment of the same portion of the fuel tank of FIG. 1.

Fourth Embodiment (FIG. 7)

All the features of the tank 1 of this embodiment are identical to those of the first embodiment except that the temperature sensor 4 is coated with a material 17 having a thermal diffusivity comprised between $2\times10^{-7}$ and $2\times10^{-5}$ m²/s at 20° C. (see FIG. 7). Such a material is capable of improving the correlation between the actual temperature on the interior of the tank 1 and the associated signal communicated by the temperature sensor 4. In the present case, the material is steel. In another embodiment, the material may be stainless steel.

FIG. 7 is a simplified view of this embodiment. The connector is not represented but is however present and comprises all the features described in the first embodiment.

Whilst the principles of the invention have been set out above in connection with specific embodiments, it is to be understood that this description is merely made by way of example and not as a limitation of the scope of the invention which is determined by the appended claims.

The invention claimed is:

1. A fuel tank comprising:
   an electronical board,
   a first sensor connected to the electronical board, the first sensor being a pressure sensor,
   a pressure port forming a hole through a wall of the tank,
   at least one second sensor extending fully inside the tank, and
   a connector connecting the second sensor to the electronical board through the
   pressure port, a first part of the connector being connected to the second sensor by at least one first wire and a second part of the connector being connected to the electronical board by at least one second wire.

2. The fuel tank according to claim 1, wherein the the first part and the second part of the connector are de-connectable from each other.

3. The fuel tank according to claim 1, wherein the connector is configured for connecting at least a third sensor to the electronical board, said connector being connected to the third sensor by at least a third wire.

4. The fuel tank according to claim 3, wherein the second sensor and/or the third sensor is attached to the tank via a support.

5. The fuel tank according to claim 3, wherein the second sensor and/or the third sensor is welded to the tank.

6. The fuel tank according to claim 3, wherein the second sensor and/or the third sensor is attached to a fuel delivery module.

7. The fuel tank according to claim 3, wherein the second sensor and/or the third sensor is selected from the group consisting of a temperature sensor, a pressure sensor and a level sensor.

8. The fuel tank according to claim 3, wherein the second sensor and/or the third sensor is a temperature sensor and is located so as to be able to measure a vapor dome temperature of the tank.

9. The fuel tank according to claim 3, wherein the second sensor and/or the third sensor is a temperature sensor and is coated with a material having a thermal diffusivity comprised between 2×10-7 and 2×10-5 m2/s.

10. The fuel tank according to claim 3, wherein at least two of the pressure sensor, the second sensor and the third sensor are arranged for sending a digitalized or multiplexed signal.

11. A vehicle comprising a fuel tank according to claim 1.

12. A method for manufacturing a plastic fuel tank comprising a first sensor and at least one second sensor, the first sensor being a pressure sensor, the method comprising:
   attaching the second sensor comprising a wire and connected to a first part of a connector, to a part of the fuel tank, and
   connecting the first part of the connector to a second part of the connector through a pressure port of the pressure sensor.

13. The method according to claim 12, wherein the attaching step comprises attaching the second sensor directly to an inner side of a wall of the tank.

14. The method according to claim 12, wherein the attaching step comprises attaching the second sensor to a fuel delivery module.

* * * * *